(12) United States Patent
Huang et al.

(10) Patent No.: US 8,929,022 B1
(45) Date of Patent: Jan. 6, 2015

(54) DISK DRIVE DETECTING MICROACTUATOR DEGRADATION BY EVALUATING FREQUENCY COMPONENT OF SERVO SIGNAL

(71) Applicant: Western Digital Technologies, Inc., Irvine, CA (US)

(72) Inventors: Yanan Huang, Torrance, CA (US); Shan Tang, Irvine, CA (US); Duc T. Phan, Saratoga, CA (US); Chuanwen Ji, Irvine, CA (US); Alain Chahwan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/720,832

(22) Filed: Dec. 19, 2012

(51) Int. Cl.
G11B 5/596 (2006.01)
G11B 21/02 (2006.01)
G11B 5/55 (2006.01)
G11B 27/36 (2006.01)

(52) U.S. Cl.
CPC .............. *G11B 5/5552* (2013.01); *G11B 21/02* (2013.01); *G11B 27/36* (2013.01)
USPC ....................................... 360/78.05

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |

(Continued)

OTHER PUBLICATIONS

Shreekant Gayaka, et al., U.S. Appl. No. 13/363,228, filed Jan. 31, 2012, 27 pages.

*Primary Examiner* — Regina N Holder

(57) ABSTRACT

A disk drive is disclosed comprising, a head, a disk surface, and a dual stage actuator (DSA) servo loop comprising a voice coil motor (VCM) servo loop comprising a VCM and a microactuator servo loop comprising a microactuator operable to actuate the head over the disk surface. A frequency component of a servo signal in the DSA servo loop is evaluated, wherein the frequency component is based on a peak frequency of an error rejection curve of the DSA servo loop. A degradation of the microactuator is detected based on the frequency component of the servo signal.

30 Claims, 8 Drawing Sheets

(56) References Cited

U.S. PATENT DOCUMENTS

| | | |
|---|---|---|
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,117 B2 | 8/2005 | Huang et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,283,321 B1 | 10/2007 | Sun et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,385,780 B2 | 6/2008 | Kim et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,423,837 B2 | 9/2008 | Hutsell |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |

(56) References Cited

U.S. PATENT DOCUMENTS

| | | | |
|---|---|---|---|
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,538,971 B2 | 5/2009 | Sun et al. |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,826,170 B2 | 11/2010 | Semba |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,335,049 B1 * | 12/2012 | Liu et al. .................... 360/78.05 |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 * | 12/2013 | Xi et al. .................... 360/78.05 |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 2010/0035085 A1 | 2/2010 | Jung et al. |
| 2012/0281310 A1 * | 11/2012 | Lim et al. .................... 360/77.02 |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

DISK DRIVE DETECTING MICROACTUATOR DEGRADATION BY EVALUATING FREQUENCY COMPONENT OF SERVO SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

FIG. 1 shows a prior art disk format 1 as comprising a number of servo tracks 3 defined by servo sectors $5_0$-$5_N$ recorded around the circumference of each servo track, wherein a plurality of data tracks are defined relative to the servo tracks. Each servo sector 5, comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector 5, further comprises groups of servo bursts 13, which are recorded with precise intervals and offsets relative to the servo track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed, such as a suitable piezoelectric (PZT) actuator. The microactuator may actuate the head over the disk in any suitable manner, such as by actuating a suspension relative to a distal end of an actuator arm, or by actuating a slider relative to the suspension.

DETAILED DESCRIPTION

Figures 2A, 2B, 2C:
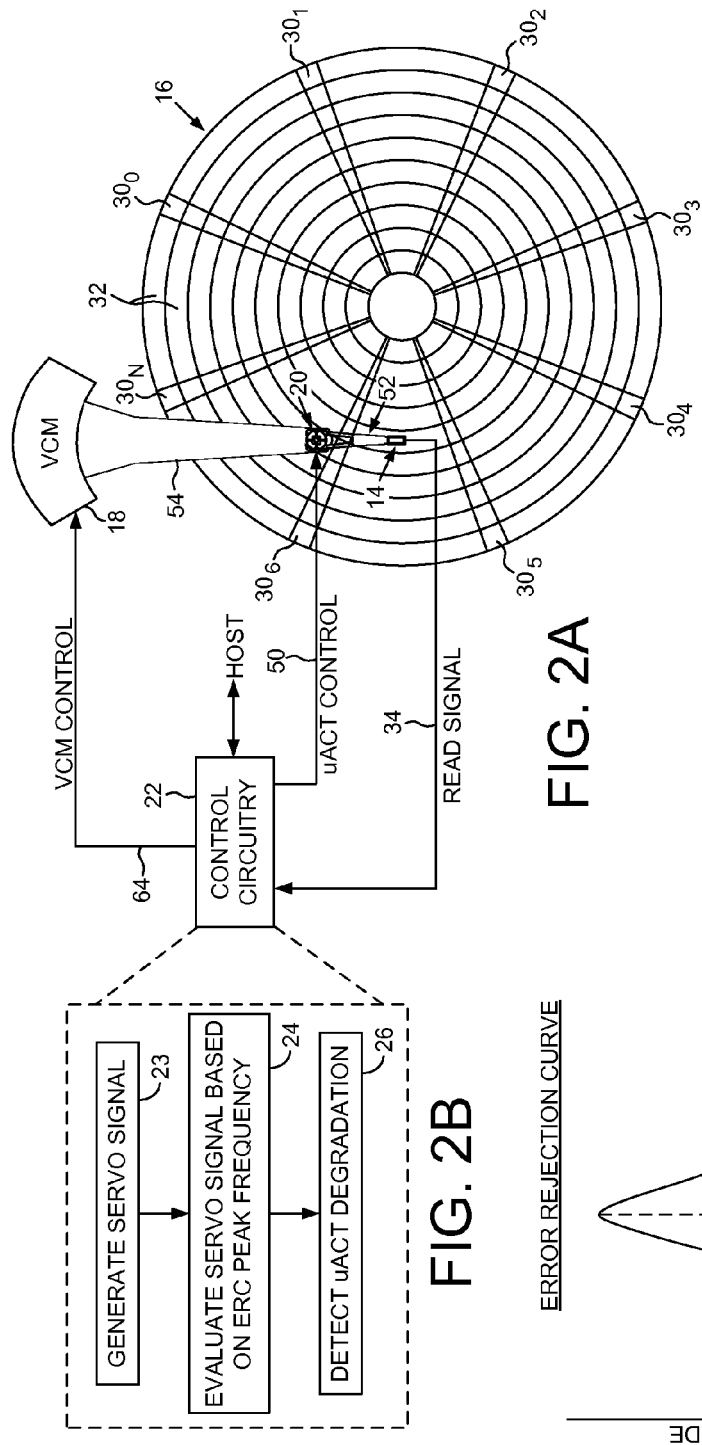
FIG. 2A shows a disk drive according to an embodiment of the present invention comprising a head actuated over a disk by a dual stage actuator (DSA) servo loop comprising a VCM servo loop and a microactuator servo loop.
FIG. 2B is a flow diagram according to an embodiment of the present invention wherein a degradation of the microactuator is detected based on a peak frequency of an error rejection curve of the DSA servo loop.
FIG. 2C illustrates a peak frequency in an error rejection curve of the DSA servo loop, wherein a change in this peak indicates degradation of the microactuator according to an embodiment of the present invention.

FIG. 2A shows a disk drive according to an embodiment of the present invention comprising a head 14, a disk surface 16, and a dual stage actuator (DSA) servo loop comprising a voice coil motor (VCM) servo loop comprising a VCM 18 and a microactuator servo loop comprising a microactuator 20 operable to actuate the head 14 over the disk surface 16. The disk drive further comprises control circuitry 22 operable to execute the flow diagram of FIG. 2B, wherein after generating a servo signal (block 23) a frequency component of the servo signal in the DSA servo loop is evaluated (block 24), wherein the frequency component is based on a peak frequency of an error rejection curve (ERC) of the DSA servo loop. A degradation of the microactuator is detected based on the frequency component of the servo signal (block 26).

FIG. 2C shows a frequency spectrum for the error rejection curve of the DSA servo loop, where a peak in the error rejection curve occurs at frequency 28. In one embodiment, when the degradation of the microactuator occurs, the peak in the error rejection curve at frequency 28 will increase. Accordingly, in an embodiment described below the degradation of the microactautor is detected when the amplitude of a servo signal (e.g., position error signal) within the DSA servo loop at the frequency 28 exceeds a threshold over a predetermined window. In other embodiments, the frequency evaluated may be based on the peak frequency 28, such as a harmonic of the peak frequency 28.

Figure 3A:
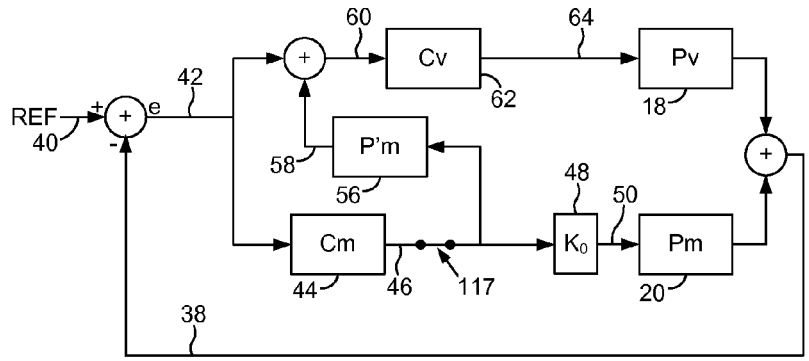
FIGS. 3A and 3B show a DSA servo loop according to an embodiment of the present invention wherein when degradation of the microactuator is detected, the microactautor servo loop is disabled in order to verify the degradation.

In the embodiment of FIG. 2A, the disk surface 16 comprises embedded servo sectors $30_0$-$30_N$ that define a plurality of servo tracks 32, wherein data tracks are defined relative to the servo tracks (at the same or different radial density). The control circuitry 22 processes a read signal 34 emanating from the head 14 to demodulate the servo sectors $30_0$-$30_N$ into an estimated position 38 (FIG. 3A). The estimated position 38 is subtracted from a reference position 40 to generate a position error signal (PES) 42 representing an error between the actual position of the head and a target position relative to a target track. The PES 42 is filtered by a microactuator compensator 44 to generate a control signal 46 amplified by a gain block 48 to generate a control signal 50 applied to the microactuator 20 which actuates a suspension 52 coupled to a distal end of an actuator arm 54. A model of the microactuator 56 processes the control signal 46 to generate a control signal 58 that is subtracted from the PES 42 to generate a VCM error signal 60 (i.e., the estimated effect of the control signal 46 on the microactuator 20 is subtracted from the PES 42 to generate the VCM error signal 60). The VCM error signal 60 is applied to a VCM compensator 62 to generate a control signal 64 that is applied to the voice coil motor (VCM) 18 which rotates the actuator arm 54 about a pivot.

Figure 1:
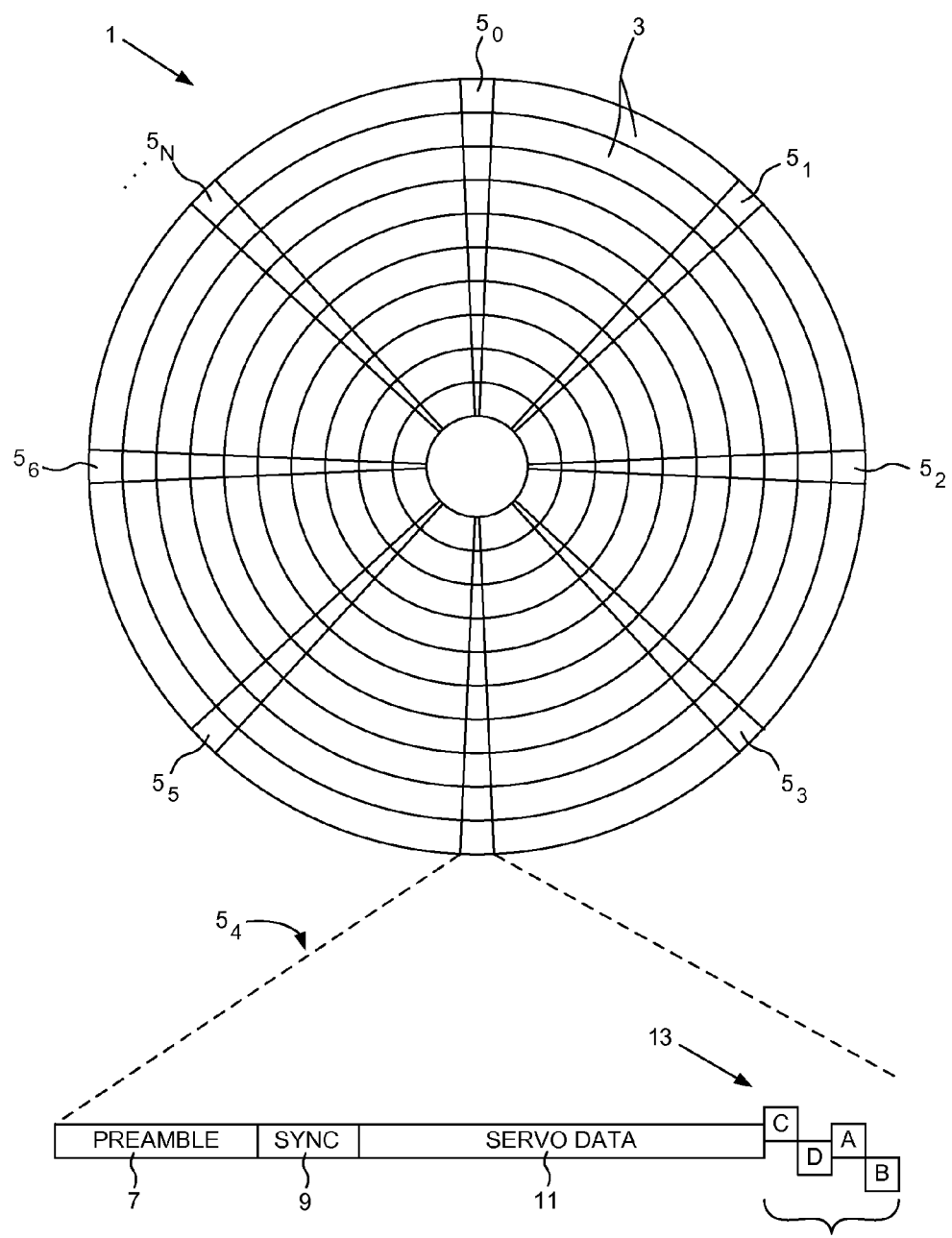
FIG. 1 shows a prior art disk format comprising a plurality of servo tracks defined by servo sectors.

The servo sectors $30_0$-$30_N$ may comprise any suitable position information, such as a track address for coarse positioning and servo bursts for fine positioning. The servo bursts may also comprise any suitable pattern, such as an amplitude-based servo pattern (e.g., the quadrature servo pattern shown in FIG. 1), or a suitable phase-based servo pattern.

Any suitable microactuator 20 may be employed in the embodiments of the present invention, such as a suitable piezoelectric microactuator. Further, the microactuator 20 may actuate the head 14 over the disk surface 16 in any suitable manner, such as by actuating a suspension 52 relative to the actuator arm 54 as in FIG. 2A, or by actuating a slider relative to the suspension 52. In one embodiment, a nominal frequency response of the microactuator 20 is determined (theoretically or empirically) and used to configure the model of the microactuator 56. However, the gain of the microactuator 20 may deviate from the nominal value over time due, for example, to changes in environmental conditions (e.g., temperature) or general degradation of the microactuator 20. Accordingly, in one embodiment degradation of the microactuator 20 is detected, and in one embodiment the degradation is compensated by adjusting gain block 48 or the model of the microactuator 56, in order to maintain a target frequency response and overall performance of the DSA servo loop. The gain block 48 may be implemented in any suitable manner, such as an adjustable analog amplifier or a digital amplifier followed by a digital-to-analog converter.

Any suitable servo signal may be evaluated in order to detect degradation of the microactautor. In one embodiment, the servo signal comprises the position error signal 42 in the DSA servo loop of FIG. 3A. In other embodiments, the servo signal may comprise one of the control signals 46 and/or 64 generated by the compensators 44 and/or 62, a signal generated internal to one of the compensators, the control signal 58 generated by the model of the microactuator 56, a signal generated internal to the model of the microactuator 56, the VCM error signal 60, etc.

Figure 4:
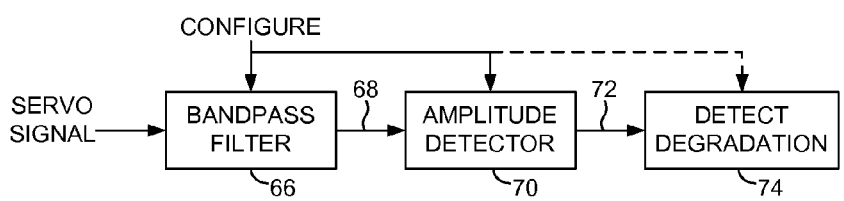
FIG. 4 shows an embodiment of the present invention wherein a servo signal is bandpass filtered in order to extract the frequency based on the peak in the error rejection curve, wherein the amplitude of the filtered servo signal is evaluated in order to detect degradation of the microactuator.

The servo signal may be evaluated in any suitable manner in order to detect the degradation of the microactuator. FIG. 4 shows an embodiment of the present invention wherein the servo signal is filtered with a bandpass filter 66 that is configured to extract a frequency component based on the peak in the error rejection curve of the DSA servo loop (frequency 28 in FIG. 2C). An amplitude detector 70 detects when the magnitude of the filtered signal 68 exceeds a threshold and outputs a corresponding indicator 72. Control circuitry 74 processes the indicator 72 to detect the degradation of the microactuator.

The components shown in FIG. 4 may be implemented in continuous-time using analog circuitry or in discrete-time using digital circuitry, or implemented with a combination of analog and digital circuitry. The bandpass filter 66 may be implemented as a linear filter (e.g., a finite impulse response filter) having a target frequency response, wherein the linear filter may be implemented in hardware or software. The filtered signal 68 may then be compared to a threshold by the amplitude detector 70 with the indicator 72 representing when the amplitude of the filtered signal 68 exceeds the threshold. In an alternative embodiment, the bandpass filter 66 and amplitude detector 70 may be implemented as a Discrete Fourier Transform (DFT) of the servo signal, wherein the magnitude of the frequency component of interest in the servo signal may be compared to a threshold to generate the indicator 72.

Figure 5:
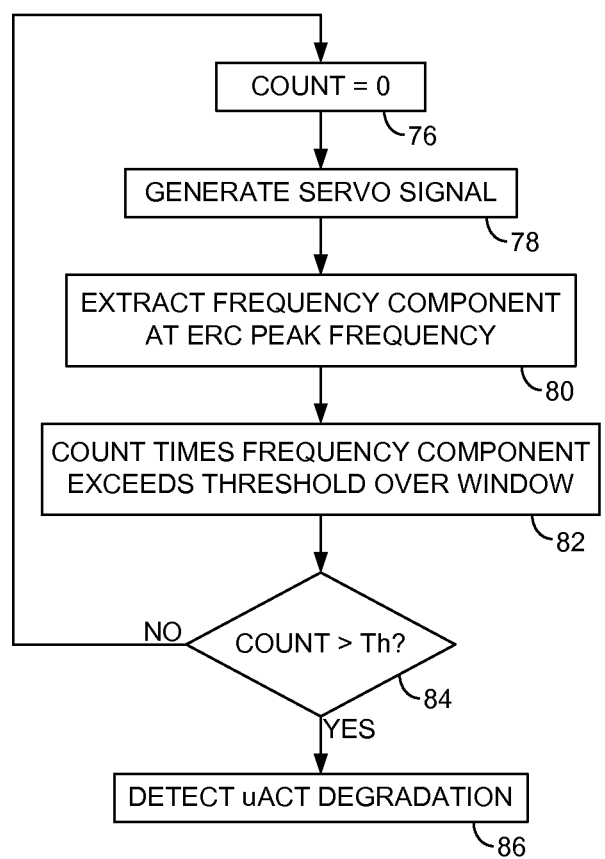
FIG. 5 is a flow diagram according to an embodiment of the present invention wherein the degradation of the microactuator is detected when the amplitude of the filtered servo signal exceeds a threshold a predetermined number of times over a predetermined window.

The indicator 72 output by the amplitude detector 70 may be processed (at block 74) in any suitable manner in order to detect the degradation of the microactuator. FIG. 5 is a flow diagram according to an embodiment of the present invention for detecting degradation of the microactuator, wherein after initializing a counter to zero (block 76) the servo signal is generated (block 78) and the frequency component extracted based on the peak frequency of the error rejection curve of the DSA servo loop (block 80). The number of times the amplitude of the frequency component exceeds a threshold over a predetermined window is counted (block 82). If the count exceeds a threshold (block 84), degradation of the microactuator is detected (block 86); otherwise, the flow diagram of FIG. 5 is repeated starting at block 76.

Figure 6:
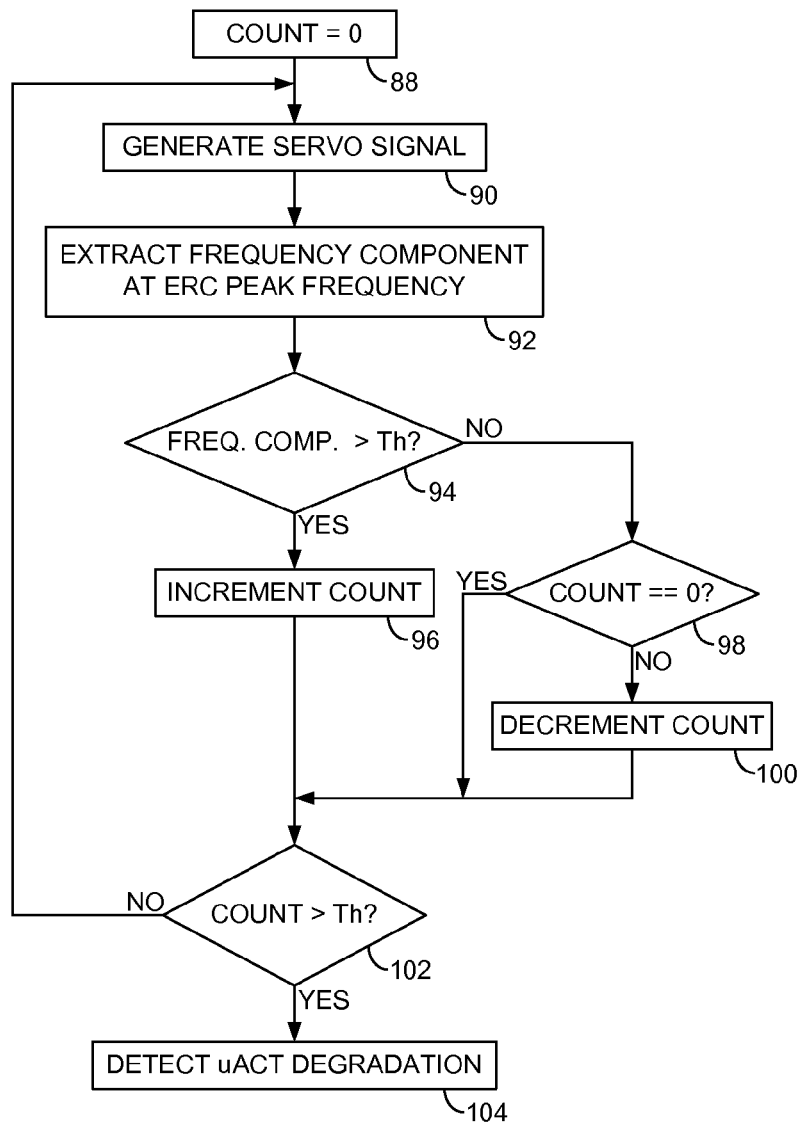
FIG. 6 is a flow diagram according to an embodiment of the present invention wherein a counter is incremented while the amplitude of the filtered signal exceeds a threshold, and decremented while the amplitude falls below the threshold.

FIG. 6 is a flow diagram according to an alternative embodiment for detecting degradation of the microactuator. After initializing a counter to zero (block 88), the servo signal is generated (block 90) and the frequency component extracted based on the peak frequency in the error rejection curve of the DSA servo loop (block 92). If the frequency component exceeds a threshold (block 94), the counter is incremented (block 96), otherwise if the counter is not zero (block 98) the counter is decremented (block 100). If the count exceeds a threshold (block 102), degradation of the microactuator is detected (block 104); otherwise, the flow diagram of FIG. 6 is repeated starting at block 90.

Figure 7:
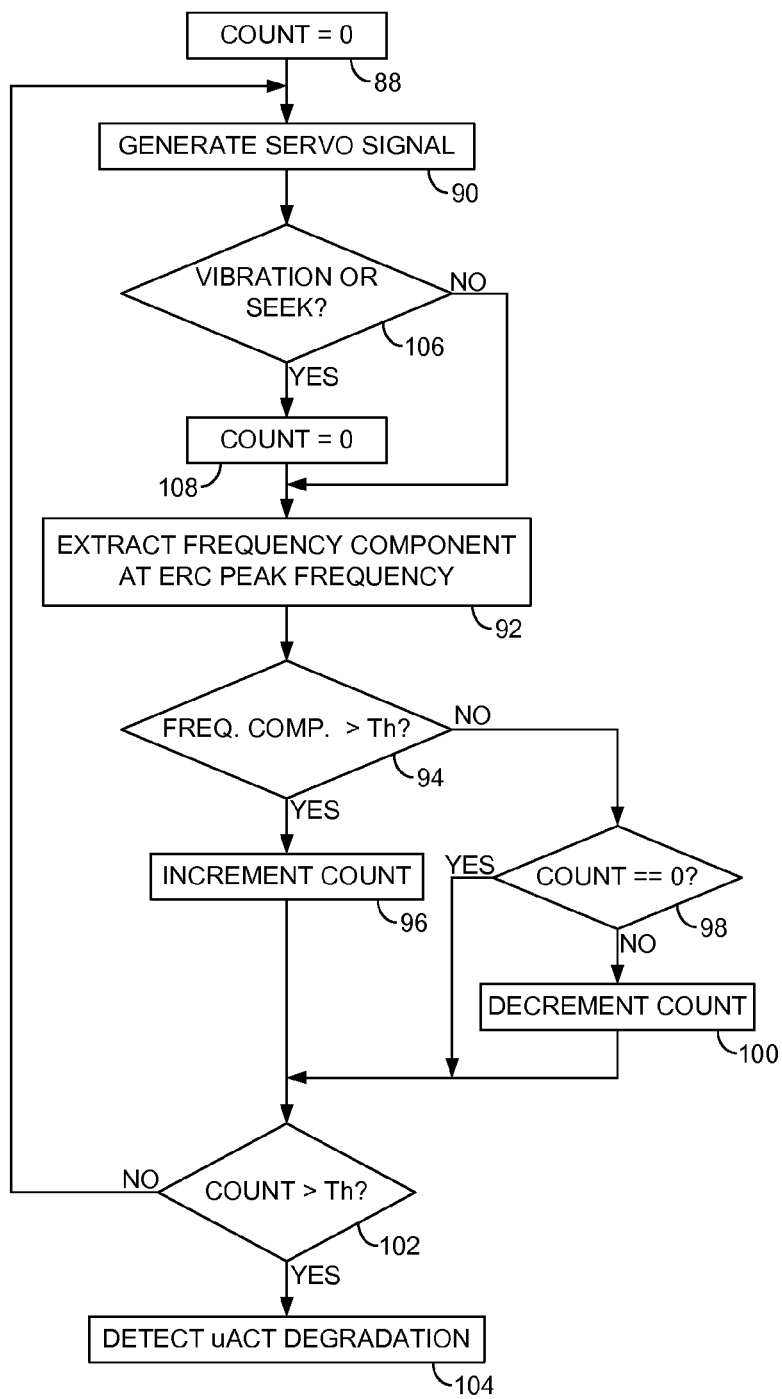
FIG. 7 is a flow diagram according to an embodiment of the present invention wherein when a vibration is detected, or when a seek is executed, the counter is reset.

FIG. 7 is a flow diagram according to an embodiment of the present invention which expands on the flow diagram of FIG. 6. In this embodiment, if a vibration is detected, or a seek is initiated (block 106), then the counter is reset to zero (block 108). In this manner, the frequency component of the servo signal is ignored during a vibration event, or when a seek is initiated, since either event may cause a change in the frequency component that is unrelated to the degradation of the microactuator. That is, the frequency component is ignored during vibration events and seeks so as to not falsely detect degradation of the microactuator.

Figure 3B:
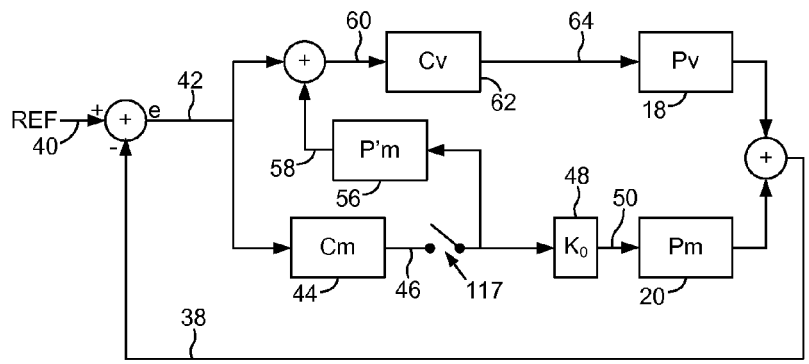
Figure 8:
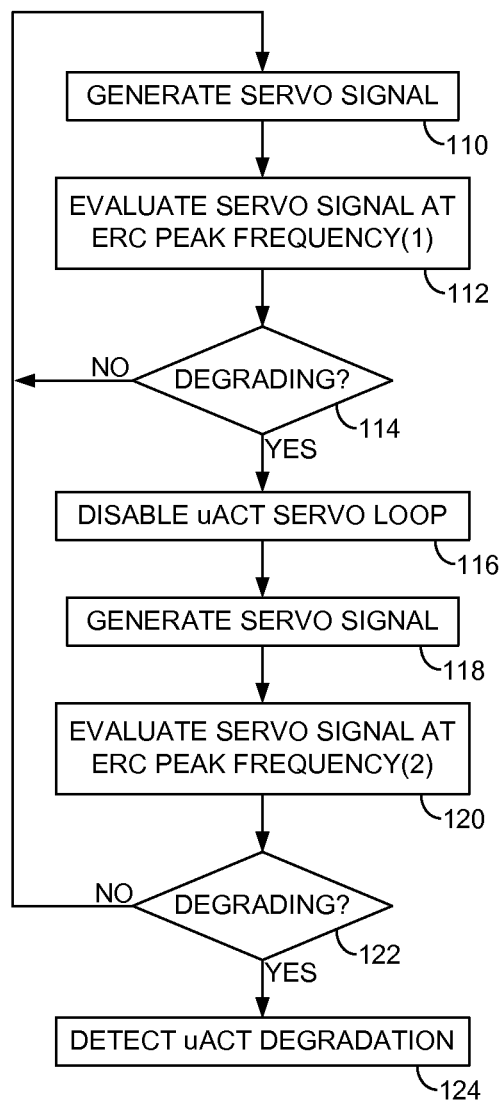
FIG. 8 is a flow diagram according to an embodiment of the present invention wherein when degradation of the microactuator is detected, the microactautor servo loop is disabled in order to verify the degradation.

FIG. 8 is a flow diagram according to an embodiment of the present invention wherein after generating the servo signal (block 110) and evaluating a first frequency component of the servo signal based on the peak frequency of the error rejection curve (block 112), if degradation of the microactuator is detected (block 114), the microactuator servo loop is disabled (block 116). In one embodiment, the microactuator servo loop is disabled by opening switch 117 in the DSA servo loop shown in FIG. 3B. The servo signal is again generated (block 118) and a second frequency component of the servo signal is evaluated based on the peak frequency of the error rejection curve (block 120). If the second frequency component indicates that the microactuator is degrading (block 122), then there is a verification that the microactuator is actually degrading (block 124). The second frequency component may be evaluated at block 120 in any suitable manner to verify that the microactuator is actually degrading. In one embodiment, the degradation is verified if the amplitude of the second frequency component corresponds to an expected amplitude when the microactuator servo loop is disabled. If this is not the case, then the deviation in the first frequency component evaluated at block 112 may be due to something other than degradation of the microactuator (e.g., due to an external disturbance or degradation of the VCM 18).

In one embodiment, the first frequency component of the servo signal evaluated at block 112 is based on the same frequency as the second frequency component of the servo signal evaluated at block 120. In an alternative embodiment, disabling the microactuator servo loop may change the peak frequency of the error rejection curve in the DSA servo loop (i.e., the frequency 28 shown in FIG. 2C may shift). Accordingly in one embodiment the second frequency component may be based on a different frequency to account for the shift in the peak frequency of the error rejection curve. In the embodiment of FIG. 4, the bandpass filter 66 may be configured to extract different frequencies of the servo signal based on whether the microactuator servo loop is enabled/disabled.

In one embodiment, verifying whether the microactuator is degrading at block 122 of FIG. 8 is determined by evaluating the amplitude of the second frequency component relative to a threshold. Referring again to FIG. 4, the threshold for verifying degradation of the microactuator may be configured by configuring the amplitude detector 70 with a suitable threshold. For example, the threshold may be configured to a lower value as compared to the threshold used to detect degradation while the microactuator servo loop is enabled. In one embodiment, the flow diagram of FIG. 5 or FIG. 6 may be re-executed, wherein degradation of the microactuator may be verified if the count is less than the threshold at block 84 or at block 102. In an alternative embodiment, the length of the window that the second frequency component is evaluated at block 82 may be adjusted rather than adjusting the threshold of the amplitude detector 70.

Figure 9A:
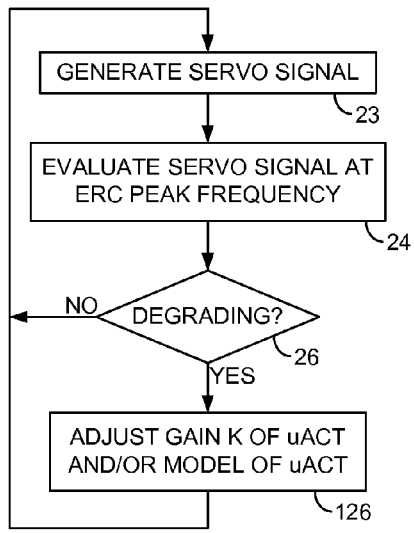
FIG. 9A is a flow diagram according to an embodiment of the present invention wherein when degradation of the microactuator is detected, the gain of the microactuator or a model of the microactautor is adjusted in order to compensate for the degradation.

In some embodiments of the present invention, the control circuitry 22 in the disk drive may take any suitable compensating action when degradation of the microactuator is detected. FIG. 9A is a flow diagram according to an embodiment of the present invention wherein when degradation of the microactuator is detected (block 26), at least one of a gain of the microactuator (e.g., gain block 48 in FIG. 3A) and/or the model of the microactautor 56 is adjusted in order to compensate for the degradation. For example, if the sensitivity of the microactuator is decreasing over time due to a change in temperature or general wear, then the model of the microactuator 56 may be adjusted to account for the decreased sensitivity. Alternatively, the gain block 48 of the microactuator may be increased to account for the decreased sensitivity.

Figure 9B:
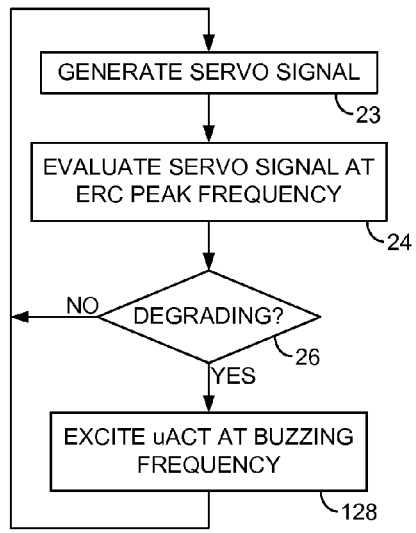
FIG. 9B is a flow diagram according to an embodiment of the present invention wherein when degradation of the microactuator is detected, the microactuator is excited at buzzing frequency in order to compensate for the degradation.

FIG. 9B is a flow diagram according to an embodiment of the present invention wherein when degradation of the microactuator is detected (block 26), the microactuator is excited with a suitable buzzing frequency, such as by generating a high frequency control signal 46 in FIG. 3A. Exciting the microactautor with a buzzing frequency may resolve the detected degradation by, for example, reducing a stiction of the microactuator or resetting a polarization of an actuating element (e.g., piezoelectric element).

Figure 9C:
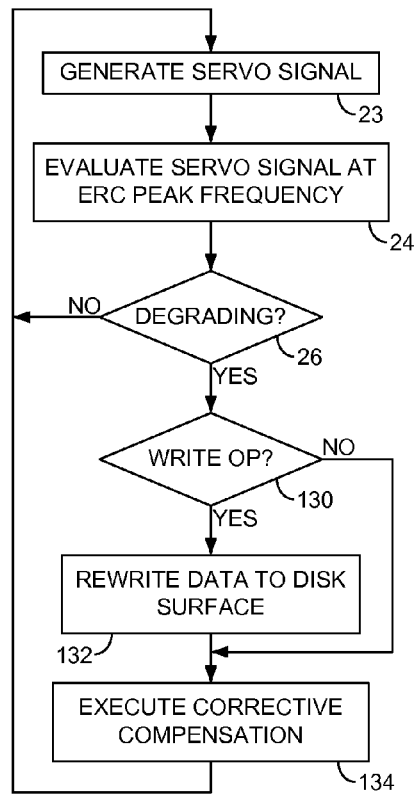
FIG. 9C is a flow diagram according to an embodiment of the present invention wherein when degradation of the microactuator is detected during a write operation, the data is rewritten to the disk surface.

FIG. 9C is a flow diagram according to an embodiment of the present invention wherein when degradation of the microactuator is detected (block 26) during a write operation (block 130), the data is rewritten to the disk surface (block 132) with an optional corrective compensation being performed (block 134) before or after the rewrite. In this embodiment, the data is rewritten after detecting the degradation since it is assumed that the degradation may have resulted in a bad write. If the detected degradation is transient, it may not be necessary to execute a corrective procedure (such as executing FIG. 9A or 9B). That is, the data may simply be rewritten to account for the possibility of a bad write without taking further action, or corrective action may be taken if the detected degradation is persistent.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a head;
    a disk surface;
    a dual stage actuator (DSA) servo loop comprising a voice coil motor (VCM) servo loop comprising a VCM and a microactuator servo loop comprising a microactuator operable to actuate the head over the disk surface;
    control circuitry operable to evaluate a first frequency component of a servo signal in the DSA servo loop, wherein the first frequency component is based on a peak frequency of an error rejection curve of the DSA servo loop; and
    detect a degradation of the microactuator based on the first frequency component of the servo signal.

2. The disk drive as recited in claim 1, wherein the servo signal comprises a position error signal representing a difference between a measured radial location of the head over the disk and a target radial location.

3. The disk drive as recited in claim 1, wherein the DSA servo loop is operable to generate a control signal applied to the microactuator in response to the servo signal.

4. The disk drive as recited in claim 1, wherein the control circuitry is further operable to detect the degradation of the microactuator based on a number of times the first frequency component of the servo signal exceeds a threshold over a predetermined time window.

5. The disk drive as recited in claim 1, wherein the control circuitry is further operable to:
    increment a counter while the first frequency component of the servo signal exceeds a first threshold;
    decrement the counter toward zero while the first frequency component of the servo signal does not exceed the first threshold; and detect degradation of the microactuator when the counter exceeds a second threshold.

6. The disk drive as recited in claim 1, wherein the control circuitry is further operable to ignore the first frequency component of the servo signal during a vibration event.

7. The disk drive as recited in claim 1, wherein the control circuitry is further operable to ignore the first frequency component of the servo signal while seeking the head to a target track on the disk surface.

8. The disk drive as recited in claim 1, wherein the control circuitry is further operable to:
    disable the microactuator servo loop after detecting the degradation of the microactuator; and
    after disabling the microactuator servo loop, evaluate a second frequency component of the servo signal to verify the degradation.

9. The disk drive as recited in claim 8, wherein the second frequency component is different than the first frequency component due to a change in the error rejection curve after disabling the microactuator servo loop.

10. The disk drive as recited in claim 1, wherein the control circuitry is further operable to:
    disable the microactuator servo loop after detecting the degradation of the microactuator; and
    after disabling the microactuator servo loop, evaluate a second frequency component of the servo signal to verify the degradation;
    wherein the degradation of the microactuator is verified based on a number of times the second frequency component of the servo signal falls below a first threshold.

11. The disk drive as recited in claim 10, wherein the control circuitry is further operable to detect the degradation of the microactuator based on a number of times the first frequency component of the servo signal exceeds a second threshold different from the first threshold.

12. The disk drive as recited in claim 1, wherein the control circuitry is further operable to adjust a gain of the microactuator when the degradation of the microactuator is detected.

13. The disk drive as recited in claim 1, wherein the control circuitry is further operable to adjust a model of the microactuator in the microactuator servo loop when the degradation of the microactuator is detected.

14. The disk drive as recited in claim 1, wherein the control circuitry is further operable to excite the microactuator with a buzzing frequency when the degradation of the microactuator is detected.

15. The disk drive as recited in claim 1, wherein the control circuitry is further operable to rewrite data to the disk surface when the degradation of the microactuator is detected during a write operation.

16. A method of operating a disk drive comprising a head, a disk surface, and a dual stage actuator (DSA) servo loop comprising a voice coil motor (VCM) servo loop comprising a VCM and a microactuator servo loop comprising a microactuator operable to actuate the head over the disk surface, the method comprising:
    evaluating a first frequency component of a servo signal in the DSA servo loop, wherein the first frequency component is based on a peak frequency of an error rejection curve of the DSA servo loop; and
    detecting a degradation of the microactuator based on the first frequency component of the servo signal.

17. The method as recited in claim 16, wherein the servo signal comprises a position error signal representing a difference between a measured radial location of the head over the disk and a target radial location.

18. The method as recited in claim 16, wherein the DSA servo loop is operable to generate a control signal applied to the microactuator in response to the servo signal.

19. The method as recited in claim 16, wherein detecting the degradation of the microactuator is based on a number of times the first frequency component of the servo signal exceeds a threshold over a predetermined time window.

20. The method as recited in claim 16, further comprising:
    incrementing a counter while the first frequency component of the servo signal exceeds a first threshold;
    decrementing the counter toward zero while the first frequency component of the servo signal does not exceed the first threshold; and
    detecting degradation of the microactuator when the counter exceeds a second threshold.

21. The method as recited in claim 16, further comprising ignoring the first frequency component of the servo signal during a vibration event.

22. The method as recited in claim 16, further comprising ignoring the first frequency component of the servo signal while seeking the head to a target track on the disk surface.

23. The method as recited in claim 16, further comprising:
    disabling the microactuator servo loop after detecting the degradation of the microactuator; and
    after disabling the microactuator servo loop, evaluating a second frequency component of the servo signal to verify the degradation.

24. The method as recited in claim 23, wherein the second frequency component is different than the first frequency component due to a change in the error rejection curve after disabling the microactuator servo loop.

25. The method as recited in claim 16, further comprising:
    disabling the microactuator servo loop after detecting the degradation of the microactuator; and
    after disabling the microactuator servo loop, evaluating a second frequency component of the servo signal to verify the degradation;
    wherein the degradation of the microactuator is verified based on a number of times the second frequency component of the servo signal falls below a first threshold.

26. The method as recited in claim 25, wherein the degradation of the microactuator is detected based on a number of times the first frequency component of the servo signal exceeds a second threshold different from the first threshold.

27. The method as recited in claim 16, further comprising adjusting a gain of the microactuator when the degradation of the microactuator is detected.

28. The method as recited in claim 16, further comprising adjusting a model of the microactuator in the microactuator servo loop when the degradation of the microactuator is detected.

29. The method as recited in claim 16, further comprising exciting the microactuator with a buzzing frequency when the degradation of the microactuator is detected.

30. The method as recited in claim 16, further comprising rewriting data to the disk surface when the degradation of the microactuator is detected during a write operation.

* * * * *